July 29, 1958 H. GROSSMAN Re. 24,508

SHOWER DOOR ENCLOSURE STRUCTURE

Original Filed March 31, 1954 3 Sheets-Sheet 1

INVENTOR:
HAROLD GROSSMAN

BY [signature]
ATT'YS

SHOWER DOOR ENCLOSURE STRUCTURE

Original Filed March 31, 1954 3 Sheets-Sheet 2

INVENTOR:
HAROLD GROSSMAN
BY Rummler Rummler and Snow
ATT'YS

SHOWER DOOR ENCLOSURE STRUCTURE

Original Filed March 31, 1954 3 Sheets-Sheet 3

INVENTOR:
HAROLD GROSSMAN

BY Rummler Rummler and Snow
ATT'YS

United States Patent Office

Re. 24,508
Reissued July 29, 1958

24,508

SHOWER DOOR ENCLOSURE STRUCTURE

Harold Grossman, Chicago, Ill.

Original No. 2,761,533, dated September 4, 1956, Serial No. 420,075, March 31, 1954. Application for reissue February 20, 1958, Serial No. 716,521

2 Claims. (Cl. 189—46)

Matter enclosed in heavy brackets [ ] appears in the original patent but forms no part of this reissue specification; matter printed in italics indicates the additions made by reissue.

This invention relates to improvements in shower door enclosure structures.

The main objects of this invention are to provide improved shower-enclosure door-frame members and mounting fixtures of a form and arrangement which will permit quick and easy assembly and installation at the point of use; to provide improved shower-door frame members and mounting fixtures of this kind which suspend the doors on rollers operating in concealed tracks and retain the doors vertically during movement by concealed guideways; and to provide improved door-frame members and mounting fixtures of this kind which are simple in construction and ornamental in appearance, making possible economic manufacture and shipment in completely knock-down or disassembled form and easy assembly and mounting by the purchasers with little or no experience, using locally-obtained door panels.

One specific embodiment of this invention is shown in the accompanying drawings, in which.

Figure 1:
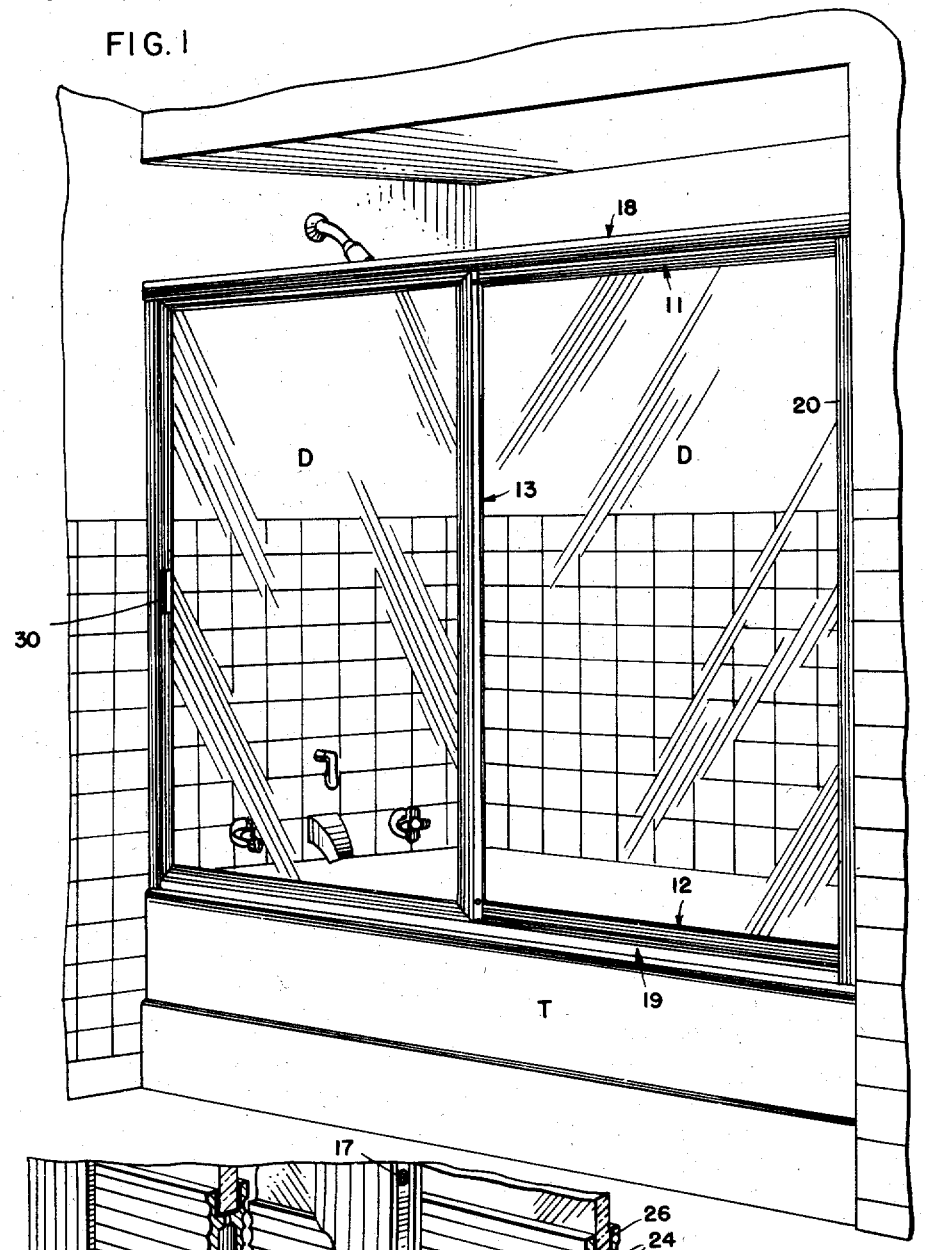
Figure 1 is a perspective view of a bath tub and shower equipped with a shower-enclosure structure embodying this invention.

The essential concept of this invention involves end-mitered, U-shape side members and h-shaped top and bottom members for framing the requisite door panels, the off-set flanges on the upper members mounting suspension rollers concealed in a channeled top supporting fixture resting on the vertical jamb fixtures and the off-set flanges on the lower members functioning as guides concealed in a channeled bottom cross fixture fitting between the ends of the jamb fixtures and anchored to the rim of a bath tub.

A shower-enclosure structure embodying the above concept includes door-panel frame members for doors D and four mounting fixtures, all separately formed with a view to having the door-frame members assembled around selected door panels and secured in appropriate operative relationship with the fixtures at the point of use. The door-panel frame comprises top and bottom members 11 and 12 and side members 13 and 14 together with angle plates 16 and their fastening screws 17. The mounting fixtures comprise a top 18, a bottom 19, and a pair of jambs 20.

The top and bottom door-panel members 11 and 12 are of substantially h-shaped in cross-section, providing channel parts 21 and outwardly disposed flanges 22 and 22' respectively. The side members 13 and 14 are of substantially identical U-shape. The exterior faces of the channel parts 21, of the top and bottom members 11 and 12, and the side members 13 and 14 are here shown fluted to produce an ornamental effect. The ends of each member are mitered so as to allow them to fit closely together around a door panel 23. Internally, the channel part of all of these four members 11, 12, 13 and 14, intermediate the base and the open edges, are formed with ledges 24 against which the peripheral edges of the door-panel 23 abuts with an interposed U-shaped cushioning strip 26. The cushioning strip 26 is preferably formed of rubber or some comparable pliable material.

The flange 22 on the top frame member 11 is a bit wider than the flange 22' on the bottom frame member 12. The former mounts the suspension rollers 27 (see Fig. 4) whereas the flange 22' serves as a door guide in coaction respectively with the top and bottom fixtures 18 and 19, as will hereinafter be pointed out.

The angle plates 16 are conventional items. Each leg is formed with a threaded aperture 28 for the reception of the screws 17 when inserted through apertures 29 in the respective frame members (see Fig. 5). When thus secured in place, as a frame around the panel 23, the opposite legs of these angle plates 16 are held against the inside bases of the channels of the respective door-frame members 11, 12, 13 and 14 outwardly of the perimeter of the door panel 23, as will be most evident from Fig. 5.

Each door D, when assembled, has a handle 30 (see Figs. 4 and 6), the flange of which is anchored between the face of the door panel 23 and the outer leg of the U-shaped side member 13 or 14.

The fixtures 18, 19 and 20 all are of differing construction in order to provide an appropriate mounting for the sliding doors D.

The top fixture 18 is U- or channel shape with opposed, transverse ledges 31, which are recessed on their innermost faces to form runways or tracks 32 for the door suspension rollers 27. It will now be seen (Fig. 4) that the doors are spaced from each other as shown by the numeral 33. Below the track flanges 31, the lateral flanges 34 are spaced to enhance the beauty of design, and the distal or free ends thereof fit snugly over the top ends of the jamb fixtures 20 to afford the sole support for the top fixture 18 and its suspended doors D.

The bottom fixture 19, formed for positioning on the outside rim of the tub T, as shown in Fig. 1, is of double E cross section (see Fig. 4) with the dividing web 41 inclined to the opposite faces of the fixture. The upper portion of the fixture 19 provides guideways 36, on opposite sides of a medial flange 37, for the flanges 22' on the bottom door frame members 12. The ridges 38 on the under side of the bottom fixture 19 provide for the application of mastic for bonding the fixture to the tub T. This fixture is set on the tub with its distal ends seated in the lower end of the side jambs 20. Drain apertures 35 are formed along the medial flange 37 and the inner ridge of the fixture 19 to insure draining of the water into the tub T as it runs down off the doors D.

Figure 2:
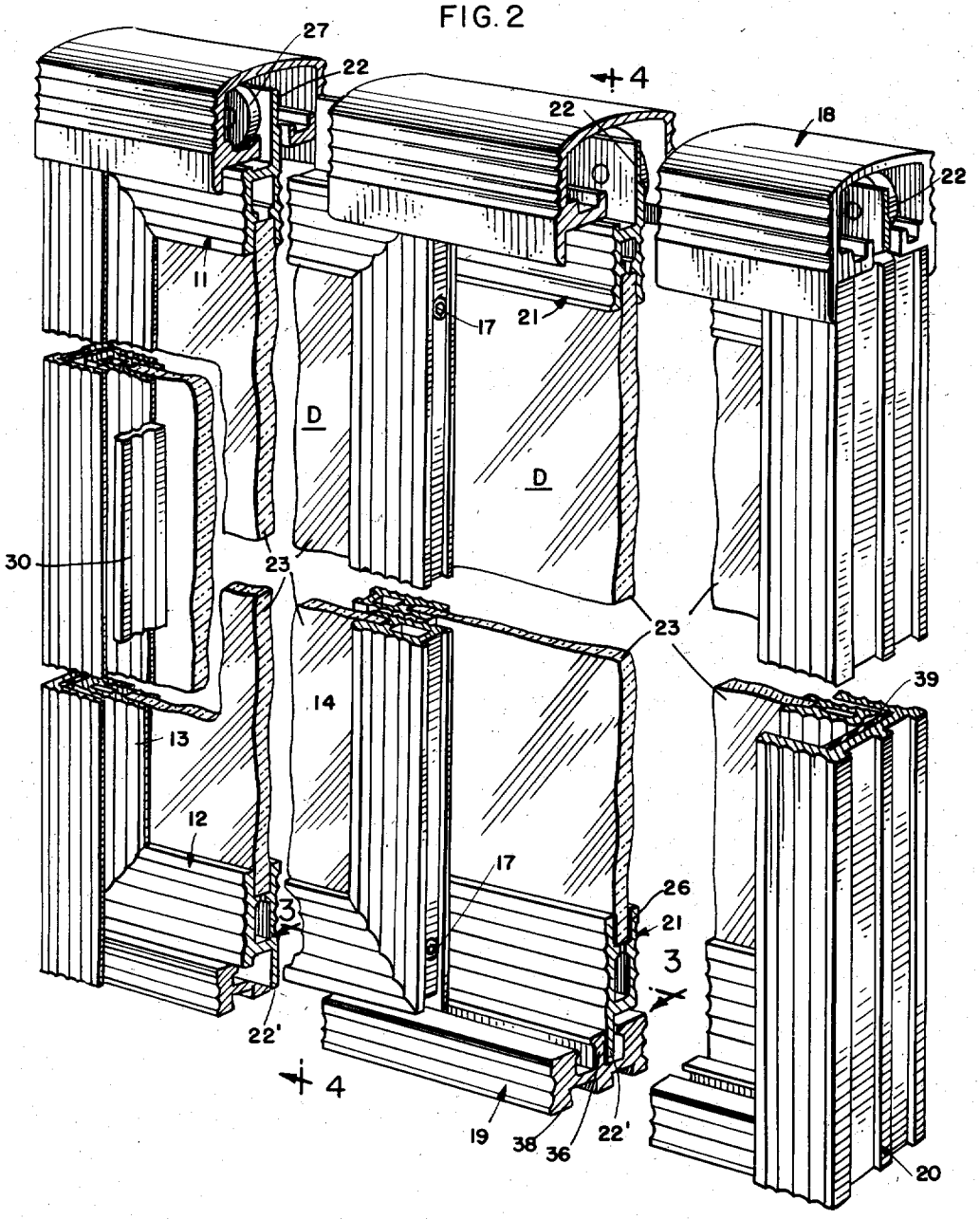
Fig. 2 is an enlarged perspective view of the assembled shower-enclosure structure, portions thereof being broken away and omitted to more clearly indicate the internal form and arrangement of the several parts.
Figure 6:
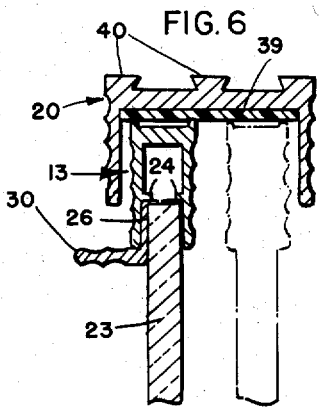
Fig. 6 is a fragmentary, cross-sectional detail taken on the line 6—6 of Fig. 4.

The form of the side or jamb fixtures 20 is best shown in Figs. 2 and 6. Along the base of the channel is secured resilient cushioning strips 39 of rubber or some comparable pliable material to afford a watertight, slightly-yielding abutment for the doors D. Like the bottom fixture 19, the ridges or rails 40 on the jamb fixtures 20 allow for the application of mastic to secure a watertight seal between the jambs and the walls to which they will be otherwise anchored.

Figure 5:
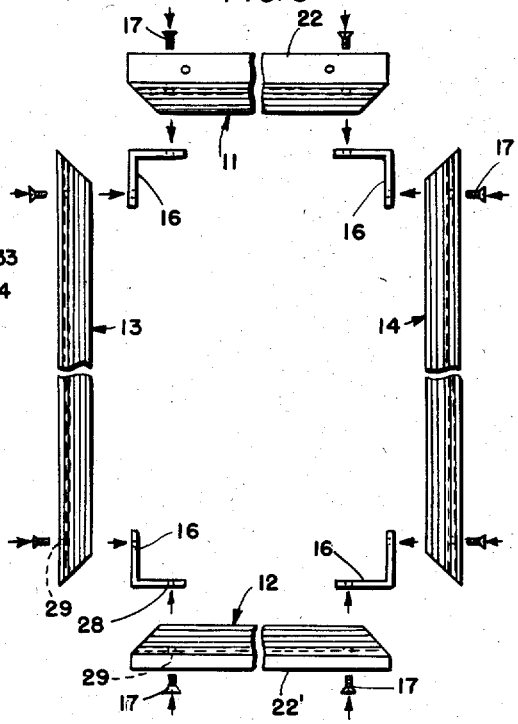
Fig. 5 is an exploded view of one of the door-panel frames and its fastening parts.

This shower-enclosure structure is assembled and mounted on and around the tub T in the following manner:

The door-frame members 11, 12, 13 and 14 are first assembled around door panels 23 of suitable material, glass or some plastic such as presently in so much use for that purpose. These several frame members and the angle plates 16 and screws 17 are laid out as shown in Fig. 5. The U-shaped cushion strip 26 is placed around the perimeter of a panel 23. The angle plates 16 are attached to the opposite ends of the side members 13 and 14 by means of screws 17 inserted through apertures 29. Then, one after another, the frame members 11, 12, 13 and 14 are placed over the cushion-stripped door panel perimeter and secured in place by inserting the screws 17 through the apertures 29 in the top and bottom members 11 and 12 to engage the threaded apertures 28 in the other legs of the angle plates 16.

The jamb fixtures 20 are placed in position first. They are first temporarily set up against the respective walls and made sure that they are plumb in both directions, whereupon the points for the anchoring screws are spotted. After subsequently applying mastic to the middle ridge 40 of each jamb 20, they are set in place and anchored to the walls by appropriate screws.

The bottom fixture is cut to fit snugly between the jambs 20 on the top of the tub T, as most clearly shown in Fig. 1. Before applying mastic to the middle ridge or rail 38 the fixture is tested for its level on the tub, the same being shimmed up where necessary to make it level. When that has been done, mastic is applied and the fixture 19 set in place as shown in Fig. 1.

Figure 3:
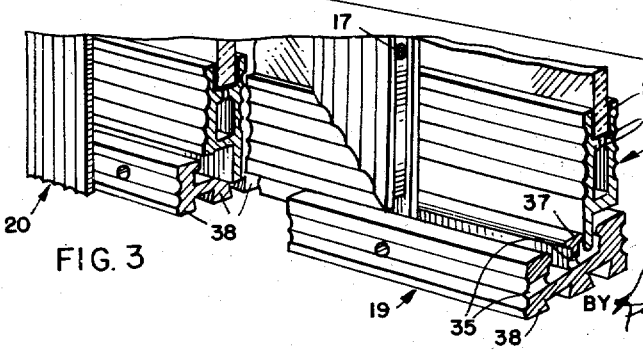
Fig. 3 is a fragmentary, inside perspective, partly in cross-section, of a lower part of the structure, as viewed from the plane of the line 3—3 of Fig. 2.
Figure 4:
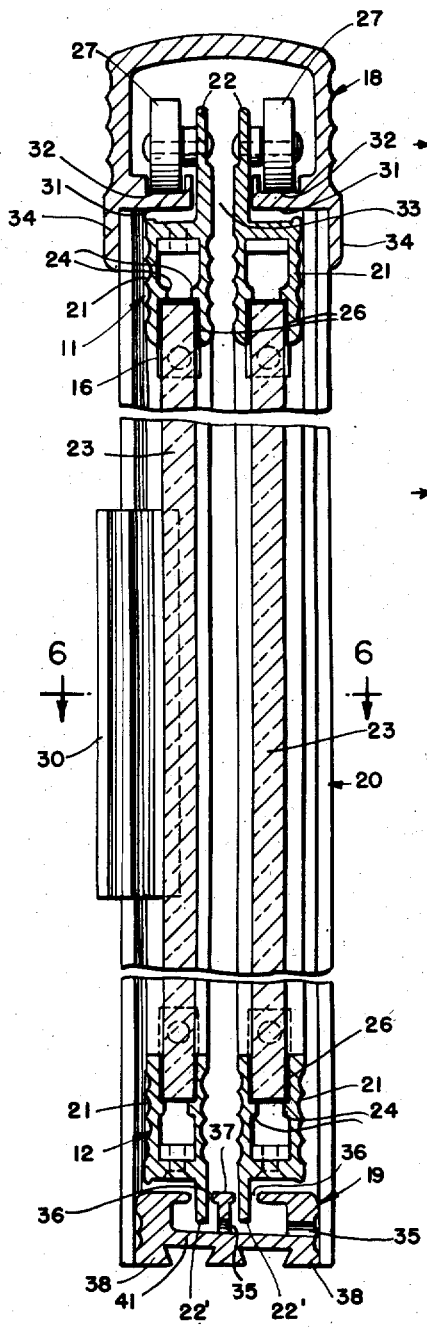
Fig. 4 is an enlarged, vertical cross-section of the assembled structure taken on the plane of the line 4—4 of Fig. 2, intermediate portions of the structure being broken away.

The top fixture 18 is cut to a length to fit readily between the walls, to which the jambs 20 are anchored, and so that it will rest on the ends of those jambs. Before final placing of the fixture 18, the doors D, with their rollers 27 upward and the flanges 22 back to back, are run in on the respective track ledges 31. This assembly of the doors D on the top fixture 18 is lifted up and positioned so that the flanges 34 slip down over the top ends of the jambs 20 with the flanges 22' of the bottom door frame members 12 disposed in the guideways 36 in the bottom fixture 19, as shown in Figs. 2, 3, and 4. The top fixture 18, when thus seated on the jamb fixtures 20, is automatically locked in place and the enclosure is ready for use.

Although but one specific embodiment of this invention is herein shown and described, it will be understood that numerous details of the construction shown may be altered or omitted without departing from the spirit of the invention as defined by the following claims.

I claim:

1. A shower-enclosure structure comprising, a door-panel frame the top and bottom members of which are identical substantially h-shaped in cross-sectional form and the side members of which are identical substantially U-shaped in cross-sectional form, the four members embracing the door panel with its perimeter seated in the channel parts of the respective members, angle brackets secured to the transverse base within the abutting ends of the frame members for securing the members to each other around the panel, *suspension rollers journalled on the flange part of said top member,* a channel-shaped suspension fixture having spaced roller runways on the interior thereof located at points intermediate the base and the outer ends of the parallel parts of the fixture, a second fixture for parallel disposition below the suspension fixture and formed with separate parallel guideways to receive the flange part on the lower door-panel frame member, the jamb fixtures each being of a length greater than the height of the panelled door and seated in the ends of the suspension member with the transverse roller guideways of the suspension member resting on the upper ends of the jamb fixtures to support the suspension fixture in place above the second fixture.

2. A shower-enclosure door-panel frame comprising, four end-mitered members, the top and bottom members being identical substantially h-shaped in cross-sectional form and the side members being identical substantially U-shaped in cross-sectional form, the four members each having an internal panel-abutting ledge formed intermediate the transverse base and the opening of the h-shaped and U-shaped channels respectively, a panel dimensioned to seat on the respective member ledges with the members embracing the panel and the mitered ends abutting, the transverse base of each member having an aperture formed therein a predetermined uniform distance inwardly from the mitered end of each member, angle plates each leg of which has a threaded aperture formed therein a distance from the angle identical with the spacing of the member apertures inwardly from their respective ends, and threaded screws inserted through the member apertures for seating in the angle plate apertures to secure the angle plates against the inner faces of the respective transverse bases of the members to hold the members in embracing relationship around the panel.

References Cited in the file of this patent or the original patent

UNITED STATES PATENTS

| | | |
|---|---|---|
| 824,693 | Hood | June 26, 1906 |
| 2,197,385 | Ricken | Apr. 16, 1940 |
| 2,331,822 | Zechiel et al. | Oct. 12, 1943 |
| 2,374,490 | Lehman | Apr. 24, 1945 |
| 2,684,506 | Tadd | July 27, 1954 |